US012650711B2

(12) United States Patent
Magi et al.

(10) Patent No.: US 12,650,711 B2
(45) Date of Patent: Jun. 9, 2026

(54) SELF-ORIENTATING PRIVACY COVER

(71) Applicant: Intel Corporation, Santa Clara, CA (US)

(72) Inventors: Aleksander Magi, Portland, OR (US); Mark E. Sprenger, Tigard, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/855,869

(22) Filed: Jul. 1, 2022

(65) Prior Publication Data

US 2022/0334618 A1      Oct. 20, 2022

(51) Int. Cl.
*G06F 1/16* (2006.01)
*G03B 11/04* (2021.01)
*H04N 23/57* (2023.01)

(52) U.S. Cl.
CPC .......... *G06F 1/1656* (2013.01); *G03B 11/041* (2013.01); *G06F 1/1686* (2013.01); *H04N 23/57* (2023.01)

(58) Field of Classification Search
None
See application file for complete search history.

(56) References Cited

U.S. PATENT DOCUMENTS

| | | | | |
|---|---|---|---|---|
| 11,422,435 | B1 * | 8/2022 | Sathe ................... | G03B 11/041 |
| 2012/0242440 | A1 * | 9/2012 | Fullerton .............. | H01F 7/0242 |
| | | | | 335/306 |
| 2015/0009399 | A1 * | 1/2015 | Jonsson ............... | G03B 11/041 |
| | | | | 348/373 |
| 2021/0132467 | A1 * | 5/2021 | Okunami ............... | H04N 23/55 |
| 2021/0181597 | A1 * | 6/2021 | Moon .................. | G03B 11/041 |
| 2021/0310641 | A1 * | 10/2021 | Grider .................. | F21V 17/002 |
| 2022/0182545 | A1 * | 6/2022 | Tang ..................... | G03B 17/12 |

FOREIGN PATENT DOCUMENTS

| | | | | | |
|---|---|---|---|---|---|
| CN | 204217039 | U | * | 3/2015 | |
| WO | WO-2008014350 | A1 | * | 1/2008 | ............. H04N 23/57 |

* cited by examiner

*Primary Examiner* — Rodney E Fuller
(74) *Attorney, Agent, or Firm* — Banner & Witcoff, Ltd.

(57) ABSTRACT

A privacy cover that includes a main body and a privacy cover orientation magnet. The privacy cover orientation magnet includes a plurality of positively biased areas and a plurality of negatively biased areas arranged in a specific orientation that allows the plurality of positively biased areas and the plurality of negatively biased areas in the privacy cover orientation magnet interact with a plurality of positively biased areas and a plurality of negatively biased areas in a display orientation magnet to self-orient the privacy cover over a sensor.

16 Claims, 12 Drawing Sheets

114

102

104

112 magnetic forces to correct rotation magnetic forces to correct X,Y placement

102

112

114

104

112

114 magnetic forces fixed position over lens / horizontal

102

SELF-ORIENTATING PRIVACY COVER

TECHNICAL FIELD

This disclosure relates in general to the field of computing, and more particularly, to a self-orientating privacy cover for use on a display.

BACKGROUND

End users have more electronic device choices than ever before. A number of prominent technological trends are currently afoot and these trends are changing the electronic device landscape. Some of the technological trends involve a device that includes a display.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

Figure 1A:
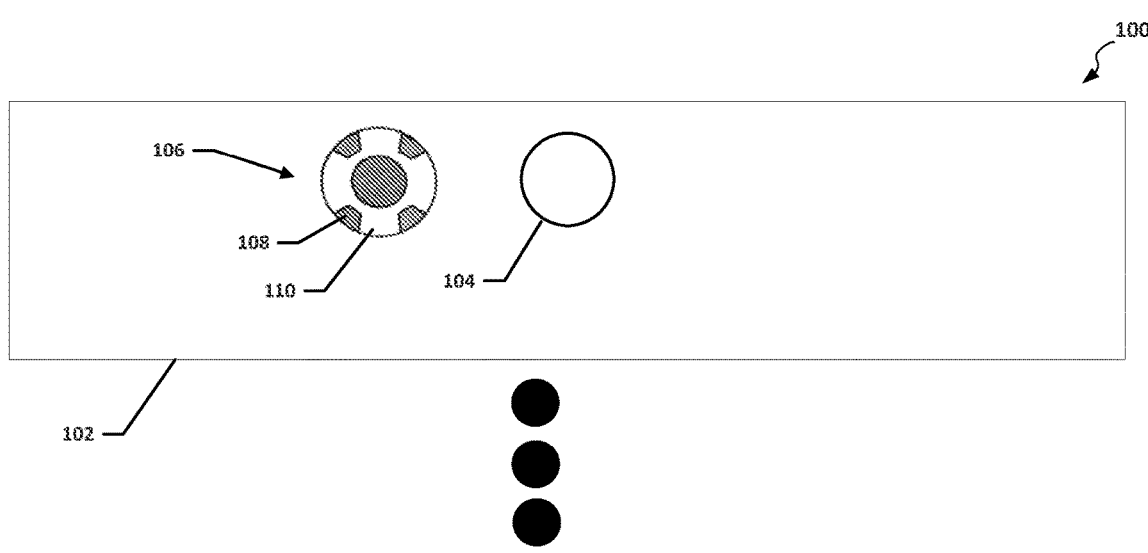
FIGS. 1A-1F are a simplified block diagram of a system to enable a self-orienting privacy cover, in accordance with an embodiment of the present disclosure.

The FIGURES of the drawings are not necessarily drawn to scale, as their dimensions can be varied considerably without departing from the scope of the present disclosure.

DETAILED DESCRIPTION

The following detailed description sets forth examples of apparatuses, methods, and systems relating to enabling self-orienting privacy cover in accordance with an embodiment of the present disclosure. Features such as structure(s), function(s), and/or characteristic(s), for example, are described with reference to one embodiment as a matter of convenience; various embodiments may be implemented with any suitable one or more of the described features.

Overview

In an example, an electronic device can include a display. The display can include an integrated camera and a display orientation magnet near the integrated camera. A privacy cover with a privacy cover orientation magnet can be placed near the display orientation magnet. The privacy cover orientation magnet is comprised of a plurality of magnets with a polarization that is opposite the polarization of a plurality of magnets in the display orientation magnet. When the privacy cover is placed near the integrated camera on the display, the privacy cover orientation magnet interacting with the display orientation magnet to cause the privacy cover to self-orientation to a position that allows the privacy cover to cover the integrated camera. The term "self-orientating," "self-orientation," and derivatives includes a device (e.g., the privacy cover) orientating itself and/or orientating without direct human involvement. The self-orientating privacy cover allows a user to cover the camera for privacy reasons without having to struggle with a manual slider or some other camera cover that can be difficult to operate, can cause smudges on the display, and/or is not aesthetically pleasing (e.g., a sticky note attached over the camera or a pop-up camera that is visually unpleasant). In some examples, the privacy cover can include an indicator that is illuminated by a light from a light pipe near the camera to provide a visual indication to the user that the camera is covered.

In the following description, various aspects of the illustrative implementations will be described using terms commonly employed by those skilled in the art to convey the substance of their work to others skilled in the art. However, it will be apparent to those skilled in the art that the embodiments disclosed herein may be practiced with only some of the described aspects. For purposes of explanation, specific numbers, materials, and configurations are set forth in order to provide a thorough understanding of the illustrative implementations. However, it will be apparent to one skilled in the art that the embodiments disclosed herein may be practiced without the specific details. In other instances, well-known features are omitted or simplified in order not to obscure the illustrative implementations.

In the following detailed description, reference is made to the accompanying drawings that form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the following detailed description is not to be taken in a limiting sense. For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B, and C). Reference to "one embodiment" or "an embodiment" in the present disclosure means that a particular feature, structure, or characteristic described in connection with the embodiment is included in at least one embodiment. The appearances of the phrase "in one embodiment" or "in an embodiment" are not necessarily all referring to the same embodiment. The appearances of the phrase "for example," "in an example," or "in some examples" are not necessarily all referring to the same example. The term "about" includes a plus or minus twenty percent (±20%) variation. For example, about one (1) millimeter (mm) would include one (1) mm and ±0.2 mm from one (1) mm.

As used herein, the term "when" may be used to indicate the temporal nature of an event. For example, the phrase "event 'A' occurs when event 'B' occurs" is to be interpreted to mean that event A may occur before, during, or after the occurrence of event B, but is nonetheless associated with the occurrence of event B. For example, event A occurs when event B occurs if event A occurs in response to the occurrence of event B or in response to a signal indicating that event B has occurred, is occurring, or will occur. Reference to "one example" or "an example" in the present disclosure means that a particular feature, structure, or characteristic described in connection with the embodiment is included in at least one example or embodiment. The appearances of the phrase "in one example" or "in an example" are not necessarily all referring to the same examples or embodiments.

Example Electronic Device

FIG. 1A is a simplified block diagram of a display 102 of a portion of an electronic device 100, in accordance with an embodiment of the present disclosure. In an example, the display 102 can include a camera 104 and a display orientation magnet 106 near the camera 104. The camera 104 can be a camera integrated into the display 102. The display orientation magnet 106 can include areas that are biased positive 108 and areas that are biased negative 110. While FIG. 1A illustrates a specific pattern or orientation of the areas that are biased positive 108 and the areas that are biased negative 110, the pattern or orientation of the areas that are biased positive 108 and the areas that are biased negative 110 can depend on design choice and design limitations.

Figure 1B:
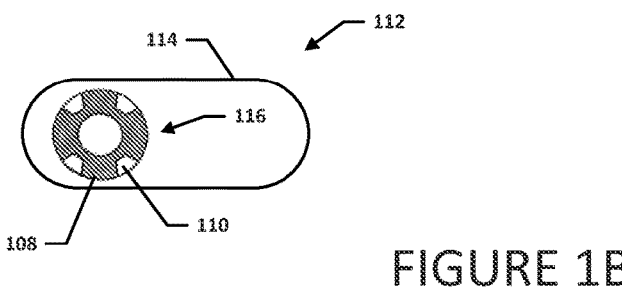

FIG. 1B illustrates a simplified block diagram of a privacy cover 112, in accordance with an embodiment of the present disclosure. The privacy cover 112 can include a main body 114 and a privacy cover orientation magnet 116. The main body 114 has a length that can cover one sensor, two sensors, or three or more sensors in the display 102. The privacy cover orientation magnet 116 can include areas that are biased positive 108 and areas that are biased negative 110. The areas that are biased positive 108 and the areas that are biased negative 110 are opposite the areas that are biased positive 108 and the areas that are biased negative 110 in the display orientation magnet 106. While FIG. 1B illustrates a specific pattern or orientation of the areas that are biased positive 108 and the areas that are biased negative 110, the pattern or orientation of the areas that are biased positive 108 and the areas that are biased negative 110 can depend on design choice and design limitations, as long as the areas that are biased positive 108 and the areas that are biased negative 110 in the privacy cover orientation magnet 116 are opposite the areas that are biased positive 108 and the areas that are biased negative 110 in the display orientation magnet 106 to help facilitate the self-orientation of the privacy cover.

Figure 1C:
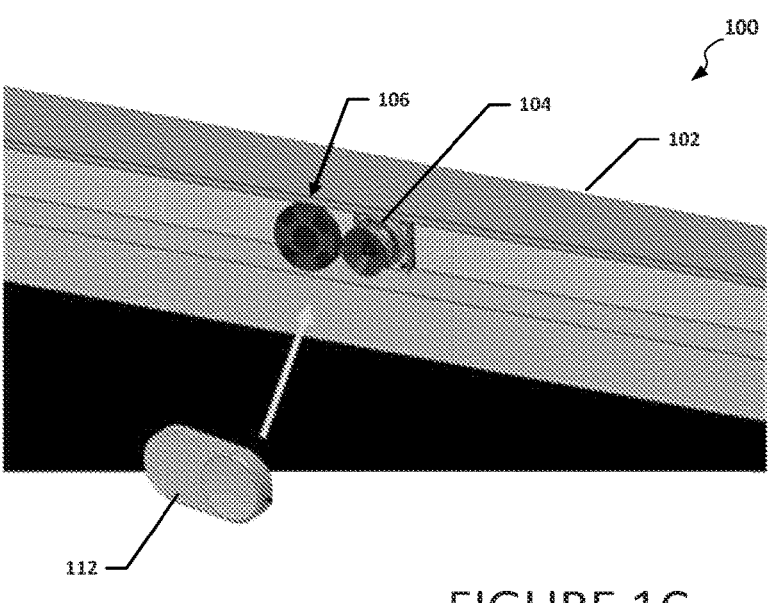

FIG. 1C illustrates a simplified block diagram of the privacy cover 112 being placed in a location that is over the camera 104 in the display 102, in accordance with an embodiment of the present disclosure. The display 102 can include the camera 104 and the display orientation magnet 106. The camera 104 and display orientation magnet 106 are behind the monitor glass (not shown) of the display 102. In some examples, the display orientation magnet 106 is not visible when viewing the display 102. The privacy cover 112 can include the main body 114 and the privacy cover orientation magnet 116 (not shown).

Figure 1D:
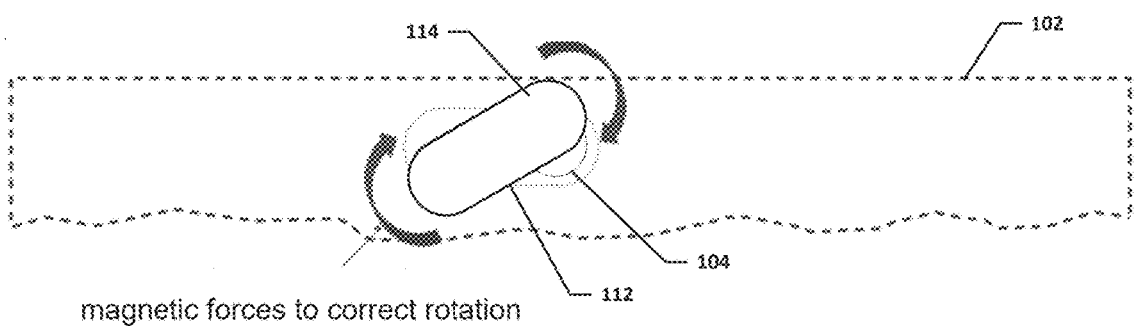
Figure 1E:
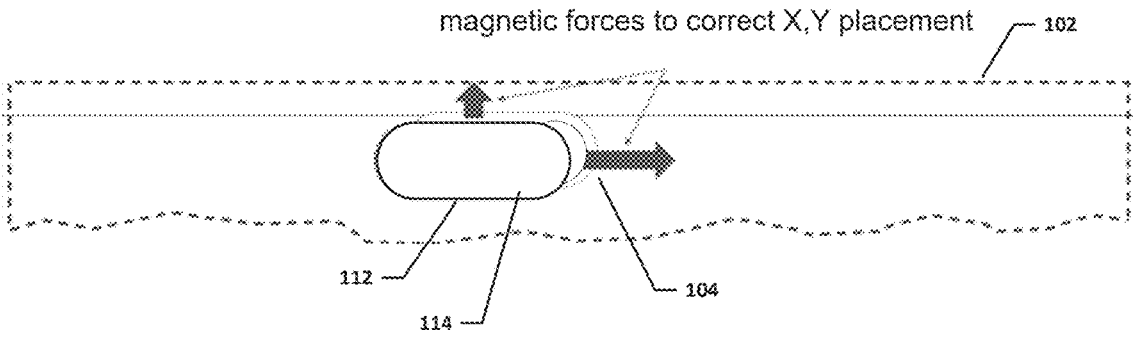
Figure 1F:
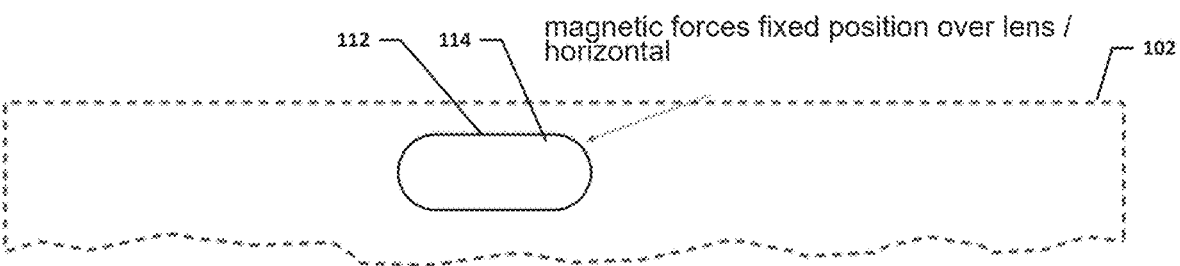

FIGS. 1D-1F are simplified block diagrams illustrating the self-orientation of the privacy cover 112 when the privacy cover 112 is placed in a location that is over the camera 104 in the display 102, in accordance with an embodiment of the present disclosure. As illustrated in FIG. 1D, if the privacy cover 112 is placed such that the main body 114 of the privacy cover 112 is above or below the camera 104, the areas that are biased positive 108 and the areas that are biased negative 110 in the privacy cover orientation magnet 116 self-orientate with the areas that are biased positive 108 and the areas that are biased negative 110 in the display orientation magnet 106 to rotate the main body 114 of the privacy cover 112 to a position over the camera 104 as illustrated in FIG. 1F. Also if the privacy cover 112 is placed such that the main body 114 of the privacy cover 112 is to one side or the other side of the camera 104, the areas that are biased positive 108 and the areas that are biased negative 110 in the privacy cover orientation magnet 116 self-orientate with the areas that are biased positive 108 and the areas that are biased negative 110 in the display orientation magnet 106 to move the main body 114 of the privacy cover 112 to a position over the camera 104, as illustrated in FIG. 1F.

It is to be understood that other embodiments may be utilized and structural changes may be made without departing from the scope of the present disclosure. Substantial flexibility is provided by the privacy cover, the electronic device, and/or the display in that any suitable arrangements and configuration may be provided without departing from the teachings of the present disclosure.

For purposes of illustrating certain example techniques of the privacy cover 112, the following foundational information may be viewed as a basis from which the present disclosure may be properly explained. A number of prominent technological trends are currently afoot (e.g., more computing devices, more online video services, more Internet traffic, etc.), and these trends are changing the media delivery landscape. One change is the use of a display. Generally, a display is an output device that displays information in pictorial form to a user.

Early electronic computers were fitted with a panel of light bulbs where the state of each particular bulb would indicate the on/off state of a particular register bit inside the computer. This allowed the engineers operating the computer to monitor the internal state of the machine and this panel of lights came to be known as the 'monitor.' As early monitors were only capable of displaying a very limited amount of information and were very transient, they were rarely considered for program output. Instead, a line printer was the primary output device and the monitor was limited to keeping track of the program's operation. Some of the first computer monitors used cathode ray tubes (CRTs). However, computer monitors that use CRTs are typically large heavy devices. LCDs and LEDs were created to reduce the size, weight, power consumption, etc. of the monitors and as the screen resolution improved, the monitors began to be called displays. As used herein, the terms "monitor" and "display" are synonymous.

One use of a display is for conference calls where users can remotely connect to each other over a network without having to physically be in the same room. Generally, the term "conference call" is used as an umbrella term for various types of online conferencing and collaborative services including webinars (web seminars), webcasts, and web meetings. Sometimes it may also be used in the more narrow sense of the peer-level web meeting context, in an attempt to disambiguate it from the other types known as collaborative sessions. In general, conference calls are made possible by Internet technologies, particularly on TCP/IP connections. Services may allow real-time point-to-point communications as well as multicast communications from one sender to many receivers. During a conference call, text-based messages, voice, and video can be shared simultaneously or near or almost simultaneously, across geographically dispersed locations. Applications for conference calls include meetings, training events, lectures, or presentations from a web-connected computer to other web-connected computers. Conference calk have become increasingly important in today's society. The conference call can offer an "in-person" meeting experience over a network and deliver real-time, face-to-face interactions between people using advanced visual, audio, and/or collaboration technologies. A conference call allows two or more locations to interact via simultaneous two-way audio and video transmissions. During the conference call, the display plays an integral part in the conference call, along with the camera that is used during the conference call.

Some emerging trends in displays include the integration of the camera into the display. The camera (or webcam) is a video camera that feeds or streams an image or video in real time to or through a computer to a network, such as the Internet. The camera is typically a relatively small device that is often built into or integrated into the display. The camera can be used during the conference call involving two or more people, with conversations that include live audio and video, during the conference calls, teleconferences, video calls, and other camera-related processes.

One drawback of a camera is the concern for privacy. Often a user may not know if the camera is on or off. Some users will cover the camera or webcam when the camera is not in use. Some current camera covers for laptops and displays include and integrated cover. One type of integrated cover is an internal privacy latch that is integrated into the display. However, an internal privacy latch can be difficult to operate quickly and can be difficult to open and close. Another type of integrated cover is an integrated privacy cover. However, an integrated privacy cover can be difficult to operate without smudging the display and some can be visually disruptive. Yet another type of integrated cover is a minimalist rail privacy cover. The minimalist rail privacy cover can be found on some smart home products. However, a minimalist rail privacy cover can also be difficult to operate quickly and can be difficult to open and close due to its relatively small size. Some camera covers are not really camera covers and include a pop-up mechanism for the camera in the display. However, the pop-up mechanism can be visually distracting when up (enabled), is not as easy to use as a slider, and has more mechanical parts and complexity than a slider.

Some camera covers are an add on accessory such as a camera flap. However, the add on camera flap can be difficult to operate quickly and may cause accidental movement of camera angle and/or dislodging of the camera product itself from the display when used. Some aftermarket camera covers include adhesive privacy covers that are attached to the display next to the camera. However, the adhesive privacy covers can be difficult to operate quickly and can create finger smudges around the slider portion of the adhesive privacy covers. Also, because the user is required to attached the adhesive privacy cover themselves, the adhesive privacy covers are not always centered properly around the camera. In addition, the sliding mechanism of some the adhesive privacy covers has a high risk of wear and tear. Some aftermarket camera covers are privacy stickers. However, privacy stickers are user intensive to attached and remove repeatedly, can become lost, and often the adhesive can wear off after repeated movements of attaching and removing. Some users use sticky tape or a sticky note. However, the sticky tape or sticky notes can be visually distracting, are user intensive to attached and remove repeatedly, can become lost, and often the adhesive can wear off after repeated movements of attaching and removing. What is needed is a self-orientating privacy cover that can self-orientate over a camera in a display.

A system, method, apparatus, means, etc. to help provide for a self-orientating privacy cover can resolve these issues (and others). In an example, a privacy cover (e.g., privacy cover 112) can include a main body (e.g., main body 114) and a privacy cover orientation magnet (e.g., the privacy cover orientation magnet 116). The privacy cover orientation magnet can include areas that are biased positive and areas that are biased negative. The areas that are biased positive and the areas that are biased negative are opposite the areas that are biased positive (e.g., the areas biased positive 108) and the areas that are biased negative (e.g., the areas that are biased negative 110) in a display orientation magnet (e.g., the display orientation magnet 106) that is located in a display (e.g., display 102) that includes an integrated camera (e.g., camera 104).

The privacy cover orientation magnet and the display orientation magnet can be configured to have a holding force that holds the privacy cover over the camera. In addition, the orientation of the positive areas and the negative areas on the privacy cover orientation magnet and the display orientation magnet help the privacy cover self-orientate and correct for rotational, vertical, and horizontal misalignment. More specifically, if the privacy cover is placed such that the main body of the privacy cover is above or below the camera, the areas that are biased positive and the areas that are biased negative in the privacy cover orientation magnet self-orientate with the areas that are biased positive and the areas that are biased negative in the display orientation magnet to rotate the main body of the privacy cover to a position over the camera. Also, if the privacy cover is placed such that the main body of the privacy cover is to one side or the other side of the camera, the areas that are biased positive and the areas that are biased negative in the privacy cover orientation magnet self-orientate with the areas that are biased positive and the areas that are biased negative in the display orientation magnet to move the main body of the privacy cover to a position over the camera.

In some examples, the display can include a light pipe. The light pipe can shine light through a light pipe aperture in the display orientation magnet, through a light pipe aperture in the privacy cover orientation magnet, and to the privacy cover. An indicator in the privacy cover can be illuminated by the light from the light pipe to give the user a visual indicator regarding the status of the camera. For example, if the camera is on, the light from the light pipe can be red (or some other color). The red light from the light pipe can travel through the light pipe aperture in the display orientation magnet and the privacy cover orientation magnet to the privacy cover and illuminate the indicator a red color to give a visual indicator to the user that the camera is on. If the camera is off, the light from the light pipe can be green or yellow and illuminate the indicator a green or yellow color to give a visual indicator to the user that the camera is off. Note that the color of the light pipe can depend on design choice. In some examples, the light pipe is an LED light. Also, the light pipe may only illuminate the indicator when the camera is on or only illuminate the indicator when the camera is off.

When the privacy cover is not in use and the user wants to use the camera (e.g., for a conference or video call), the privacy cover can be secured to the side of the display if the side of the display is magnetic or the privacy cover can be secured to some other area of the display that is magmatic. When the user wants privacy and wants to cover the camera, the user can place the privacy cover near the camera and the privacy cover will self-orientate to ensure the camera is covered. If the user does not feel like seeing the privacy cover at all on the monitor, the privacy cover can be placed on a table or stored, without the worry of having the engagement mechanism (magnet) wearing out or being damaged like with adhesive and some mechanical solutions.

The privacy cover can provide a user friendly, rail-less system that self-orientates over the camera relatively quicker and more intuitively than some current solutions. Also, the privacy cover can be more customizable by allowing the privacy cover to cover the camera, be accessible to the side of the camera, or moved to the side of the display or removed completely from the display for a period of time without the risk of damaging the engagement mechanism. The privacy cover also removes the risk of adhesive residue being left on the display and smudging of the camera and/or display.

Figure 2A:
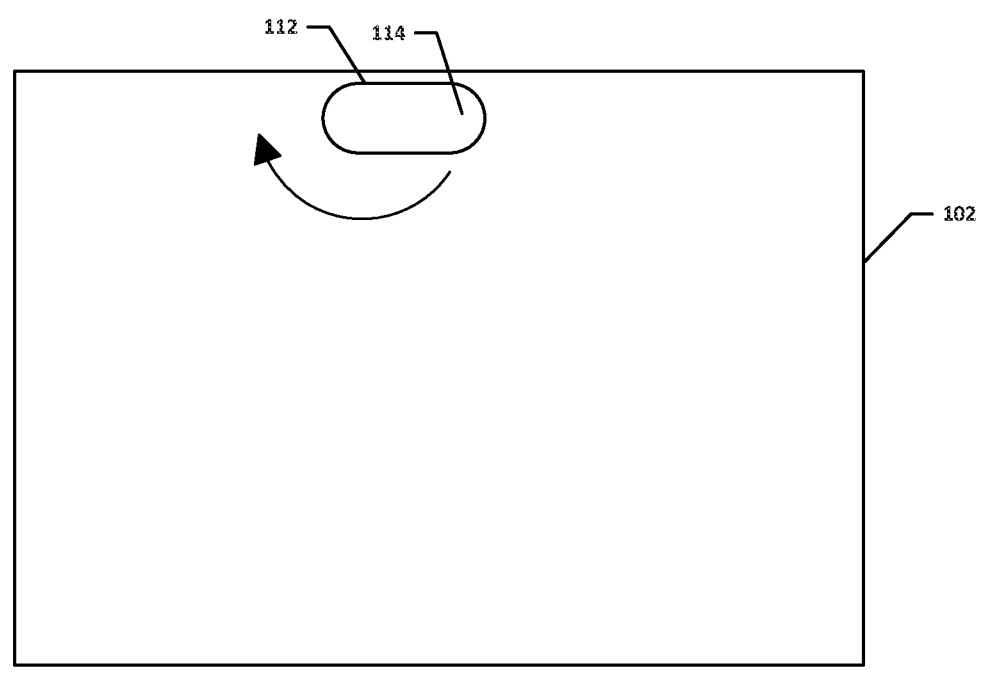
FIGS. 2A and 2B are simplified block diagrams illustrating example details of a portion of a system to enable a self-orienting privacy cover, in accordance with an embodiment of the present disclosure.
Figure 2B:
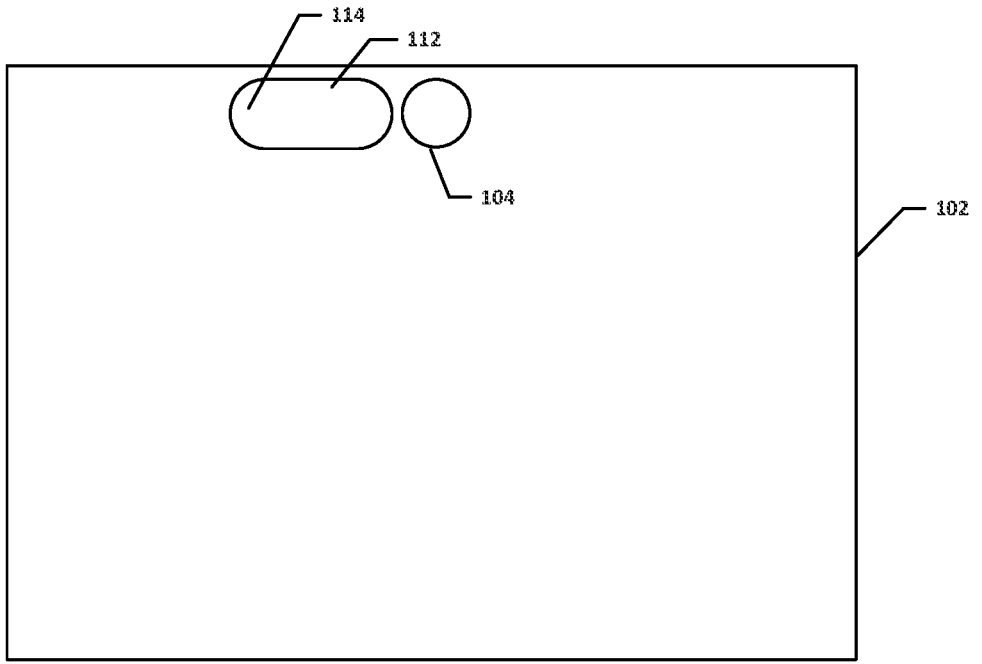

FIGS. 2A and 2B illustrate example details of the privacy cover 112, in accordance with an embodiment of the present disclosure. As illustrated in FIG. 2A, when the privacy cover 112 is covering the camera 104 (illustrated in FIG. 2B), the privacy cover 112 can be rotated one-hundred and eighty degrees or a user can begin to rotate the privacy cover 112 one-hundred and eighty degrees. Because of the orientation or configuration of the areas that are biased positive 108 and the areas that are biased negative 110 in the privacy cover orientation magnet 116, at some point during the rotation of the privacy cover 112, the privacy cover orientation magnet 116 will self-orientate with the areas that are biased positive 108 and the areas that are biased negative 110 in the display orientation magnet 106 to rotate the main body 114 of the privacy cover 112 one-hundred and eighty degrees to the position illustrated in FIG. 2B.

Figure 3A:
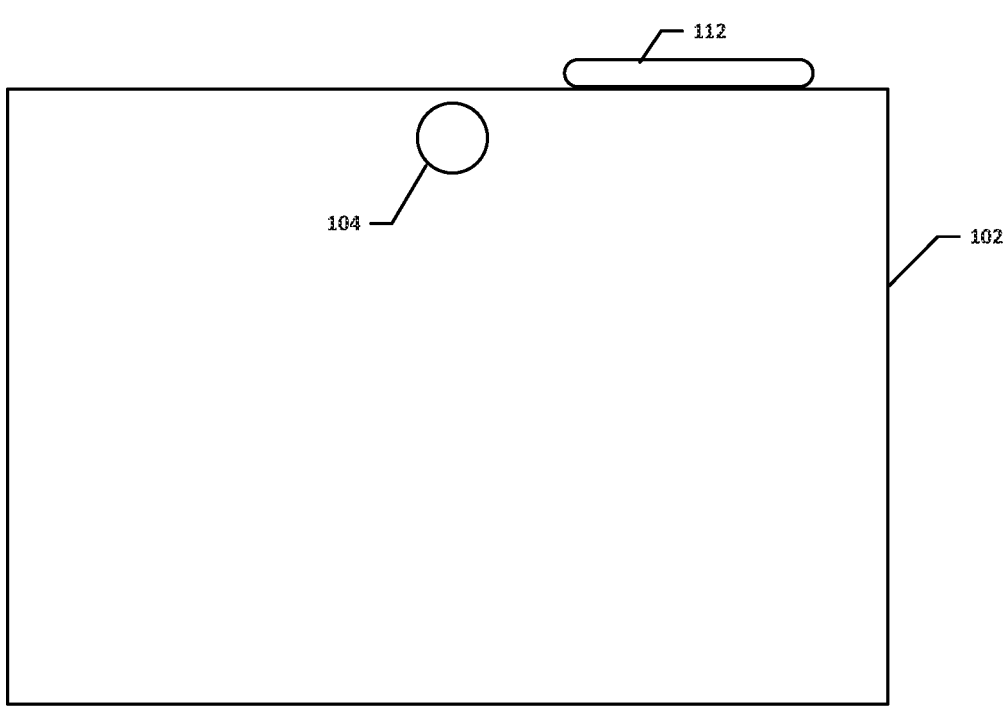
FIGS. 3A and 3B are simplified block diagrams illustrating example details of a portion of a system to enable a self-orienting privacy cover, in accordance with an embodiment of the present disclosure.
Figure 3B:
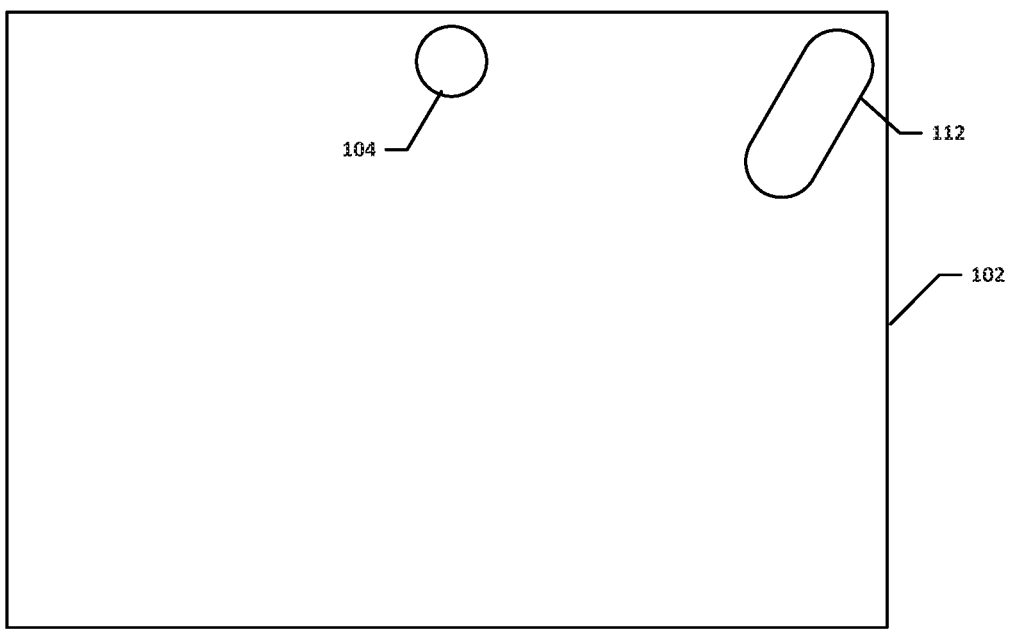

FIGS. 3A and 3B illustrate the privacy cover 112 being stored on the display 102 when not in use, in accordance with an embodiment of the present disclosure. Because the privacy cover 112 includes the privacy cover orientation magnet 116, the privacy cover 112 can be magnetically coupled to almost any area on the display 102 or electronic device 100 that is magnetic (except near the memory or other components that are sensitive to magnetic interference). For example, the bezel of some displays 102 is magnetic or portions of the bezel of some displays 102 is magnetic and the privacy cover 112 can be magnetically coupled to the bezel of the display 102 and stored, as illustrated in FIG. 3A. In addition, some displays 102 have a magnet or magnetic area in or near the corner of the display and the privacy cover 112 can be magnetically coupled to the corner of the display 102 and stored, as illustrated in FIG. 3B. In some examples, when the privacy cover 112 is coupled to the magnetic area of the display 102, the privacy cover 112 can hold a note or other material between the privacy cover 112 and the display.

Figure 4A:
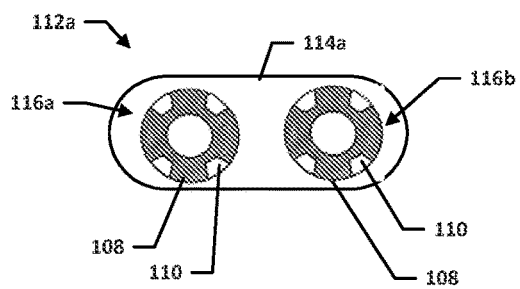
FIG. 4A-4C are simplified block diagrams illustrating example details of a portion of a system to enable a self-orienting privacy cover, in accordance with an embodiment of the present disclosure.
Figure 4B:
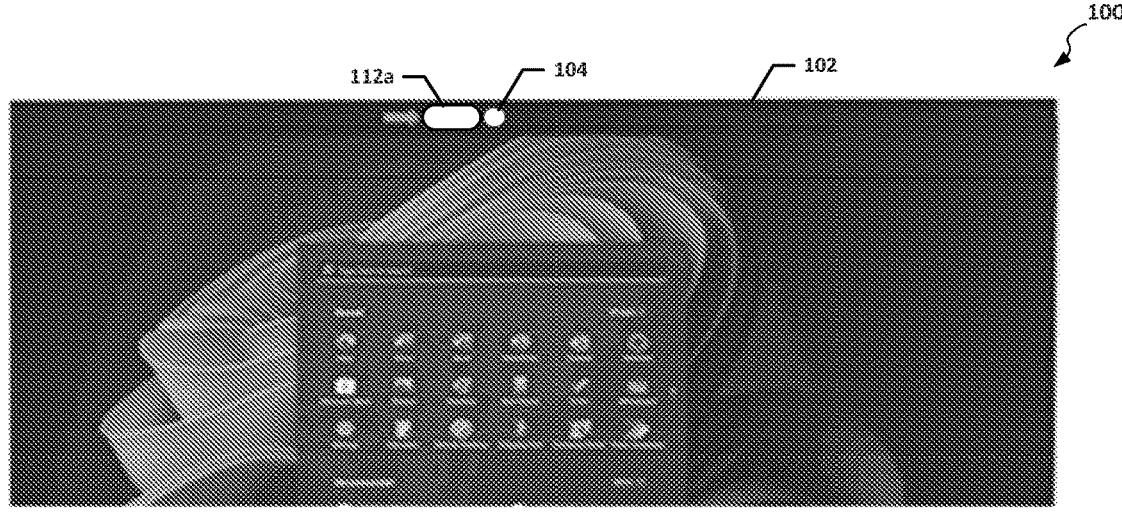
Figure 4C:
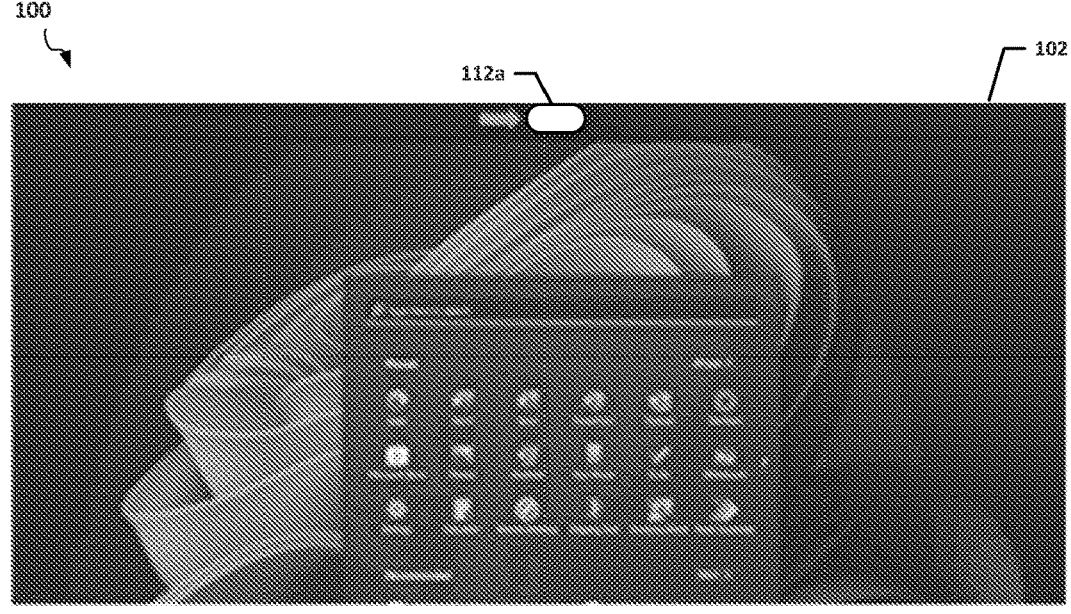

Turning to FIGS. 4A-4C, FIGS. 4A-4C are a simple block diagrams illustrating example details of a portion of a privacy cover 112a, in accordance with an embodiment of the present disclosure. As illustrated in FIG. 4A, the privacy cover 112a can include a main body 114a, a first privacy cover orientation magnet 116a, and a second privacy cover orientation magnet 116b. The first privacy cover orientation magnet 116a and the second privacy cover orientation magnet 116b can have the areas that are biased positive 108 and the areas that are biased negative 110. The first privacy cover orientation magnet 116a and the second privacy cover orientation magnet 116b can have the same specific pattern or orientation of the areas that are biased positive 108 and the areas that are biased negative 110. While FIG. 4A illustrates a specific pattern or orientation of the areas that are biased positive 108 and the areas that are biased negative 110, the pattern or orientation of the areas that are biased positive 108 and the areas that are biased negative 110 can depend on design choice and design limitations, as long as the areas that are biased positive 108 and the areas that are biased negative 110 in the privacy cover orientation magnet 116 are opposite the areas that are biased positive 108 and the areas that are biased negative 110 in the display orientation magnet 106.

As illustrated in FIG. 413, when the privacy cover 112a is placed on the display 102 close to the camera 104, the areas that are biased positive 108 and the areas that are biased negative 110 in the first privacy cover orientation magnet 116a (or the second privacy cover orientation magnet 116a, depending on the orientation of the privacy cover 112a) self-orientate with the areas that are biased positive and the areas that are biased negative in the display orientation magnet (not shown) to rotate the main body 114a of the privacy cover to a position next to the camera. As illustrated in FIG. 4C, when the privacy cover 112a is moved on the display 102 to a location such that the main body 114a is over or close to being over the camera 104, the areas that are biased positive 108 and the areas that are biased negative 110 in the first privacy cover orientation magnet 116b (or the second privacy cover orientation magnet 116a, depending on the orientation of the privacy cover 112a) self-orientate with the areas that are biased positive and the areas that are biased negative in the display orientation magnet (not shown) to rotate the main body 114a of the privacy cover to a position over the camera.

Figure 5:
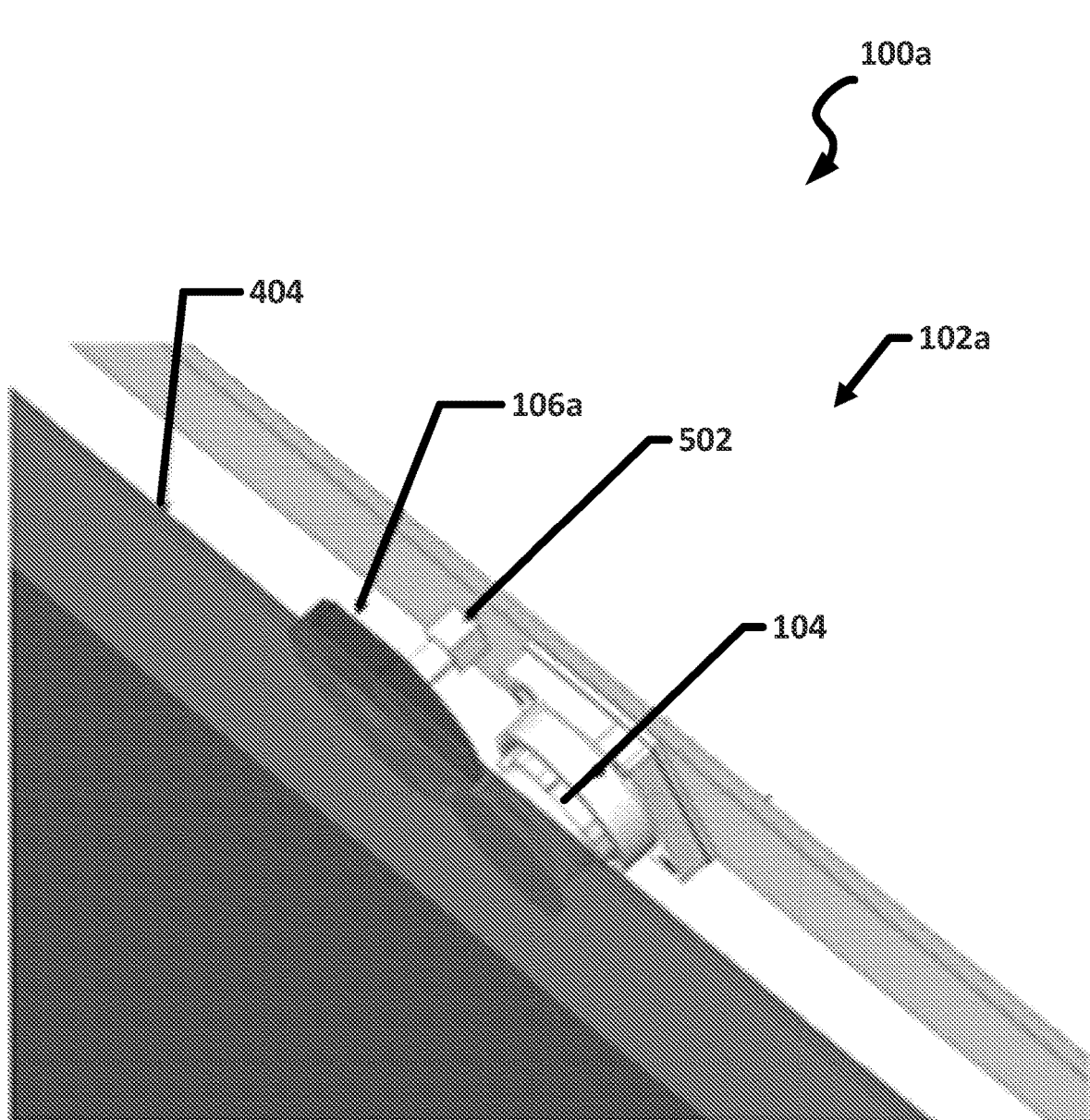
FIG. 5 is a simplified block diagram illustrating example details of a portion of a system to enable a self-orienting privacy cover, in accordance with an embodiment of the present disclosure.

Turning to FIG. 5, FIG. 5 is a simple block diagram illustrating example details of a portion of a display 102a in an electronic device 100a for use with a privacy cover with an indicator, in accordance with an embodiment of the present disclosure. As illustrated in FIG. 5, the display 102a can include the camera 104, a display orientation magnet 106a near the camera 104, and a light pipe 502 near the camera 104. The camera 104, the display orientation magnet 106a, and the light pipe 502 are behind the monitor glass 504 of the display 102a. In some examples, the display orientation magnet 106a is not visible when viewing the display 102a. The display orientation magnet 106a is described in more detail with reference to FIG. 6.

The light pipe 502 can be used to provide a visual indication to the user that the camera 104 is covered and in some examples, the light pipe 502 can be used to provide a visual indication to the user regarding a status of the camera (e.g., if the camera is on or off). More specifically, the light pipe 502 can shine light through a light pipe aperture in the display orientation magnet 106a and a privacy cover orientation magnet 116c (illustrated in FIG. 6) to the privacy cover 112b (illustrated in FIG. 7). In some examples the light pipe is an LED light pipe.

Figure 6:
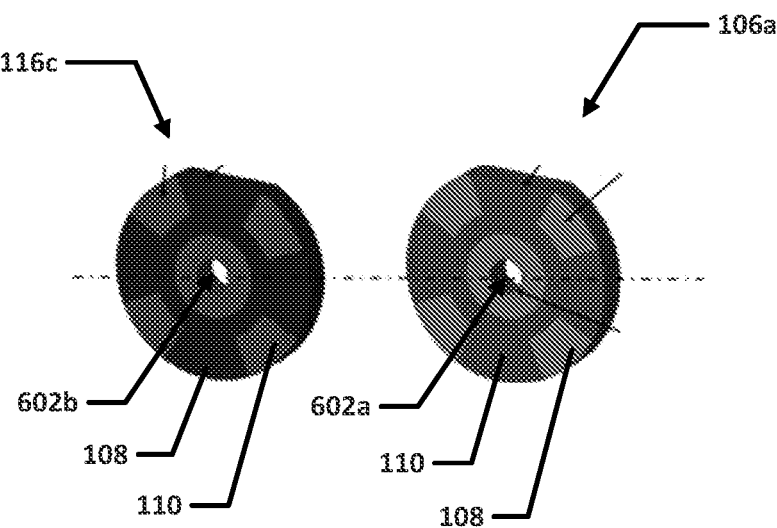
FIG. 6 is a simplified block diagram illustrating example details of a portion of a system to enable a self-orienting privacy cover, in accordance with an embodiment of the present disclosure.

As illustrated in FIG. 6, the display orientation magnet 106a can include the areas that are biased positive 108 and the areas that are biased negative 110. The display orientation magnet 106a can also include a light pipe aperture 602a. The privacy cover orientation magnet 116c can include the areas that are biased positive 108 and the areas that are biased negative 110. The privacy cover orientation magnet 116c also can include a light pipe aperture 602b. While FIG. 6 illustrates a specific pattern or orientation of the areas that are biased positive 108 and the areas that are biased negative 110 the pattern or orientation of the areas that are biased positive 108 and the areas that are biased negative 110 can depend on design choice and design limitations, as long as the areas that are biased positive 108 and the areas that are biased negative 110 in the privacy cover orientation magnet 116c are opposite the areas that are biased positive 108 and the areas that are biased negative 110 in the display orientation magnet 106a. When the privacy cover orientation magnet 116c is coupled to the display orientation magnet 106a, the light pipe aperture 602a in the display orientation magnet 106a lines up with the light pipe aperture 602b in the privacy cover orientation magnet 116c to allow light from a light pipe (e.g., the light pipe 502) to pass through the display orientation magnet 106a and the privacy cover orientation magnet 116c.

Figure 7:
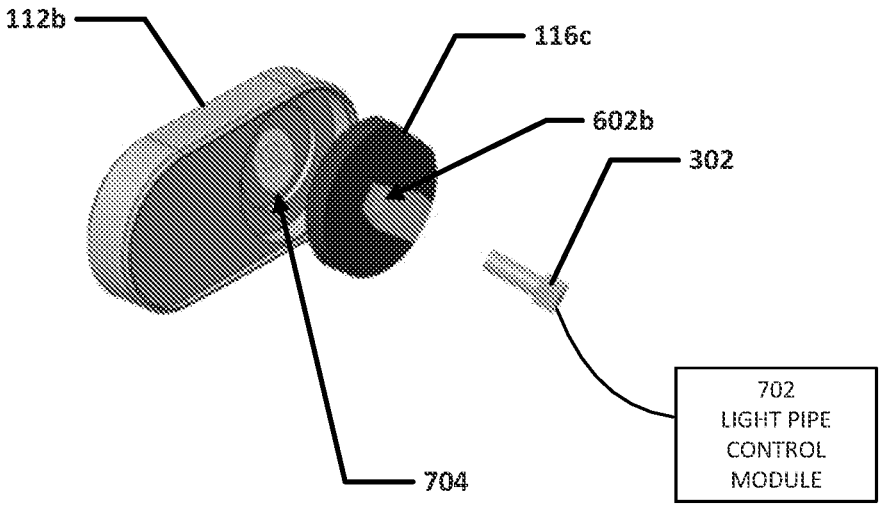
FIG. 7 is a simplified block diagram illustrating example details of a portion of a system to enable a self-orienting privacy cover, in accordance with an embodiment of the present disclosure.

Turning to FIG. 7, FIG. 7 is a simple block diagram illustrating example details of a portion of a privacy cover, in accordance with an embodiment of the present disclosure. As illustrated in FIG. 7, a privacy cover 112b can include the privacy cover orientation magnet 116c and an indicator 704. The privacy cover orientation magnet 116c can include the light pipe aperture 602b. In an illustrative example, light from the light pipe 502 can pass through the light pipe aperture 602a in the display orientation magnet 106a (not shown illustrated in FIG. 6), through the light pipe aperture 602b in the privacy cover orientation magnet 116c, and to the indicator 704.

A light pipe control module 702 can control the color and/or light (on or off) from the light pipe 502. In some examples, the light pipe control module 702 can use the amount of ambient light collected by the camera (not shown) to determine if the camera is covered by the privacy cover 112b. More specifically, if the ambient light collected by the camera is below a threshold (e.g., 10% or less light), then the light pipe control module 702 can determine that the camera is covered by the privacy cover 112b (or some other object) and control the light pipe 502 as described below. In some examples, a light dependent resistor can be used as a darkness sensor to determine when the camera is covered by the privacy cover 112b. The light dependent resistor can be exposed semiconductor material such as cadmium sulphide that changes its electrical resistance from several thousand ohms in the dark to only a few hundred ohms when light falls upon the light dependent resistor by creating hole-electron pairs in the exposed semiconductor material of the light dependent resistor.

The light pipe control module 702 can control the light from the light pipe 502 that illuminates the indicator 704 to give the user a visual indicator regarding the status of the camera (not shown). For example, if the camera is on, the light from the light pipe 502 can be red (or some other color). The red light from the light pipe 502 can travel through the light pipe aperture in the display orientation magnet (not shown), through the light pipe aperture 602b in the privacy cover orientation magnet 116c, and to the indicator 704 in the privacy cover 112b and illuminate the indicator 704 a red color to give a visual indicator to the user that the camera is on. If the camera is off, the light from the light pipe 502 can be green or yellow and illuminate the indicator 704 a green or yellow color to give a visual indicator to the user that the camera is off. Note that the color of the light pipe 502 can depend on design choice. In some examples, the light pipe 502 is an LED light. Also, the light pipe 502 may only illuminate the indicator 704 when the camera is on or only illuminate the indicator 704 when the camera is off.

Figure 8:
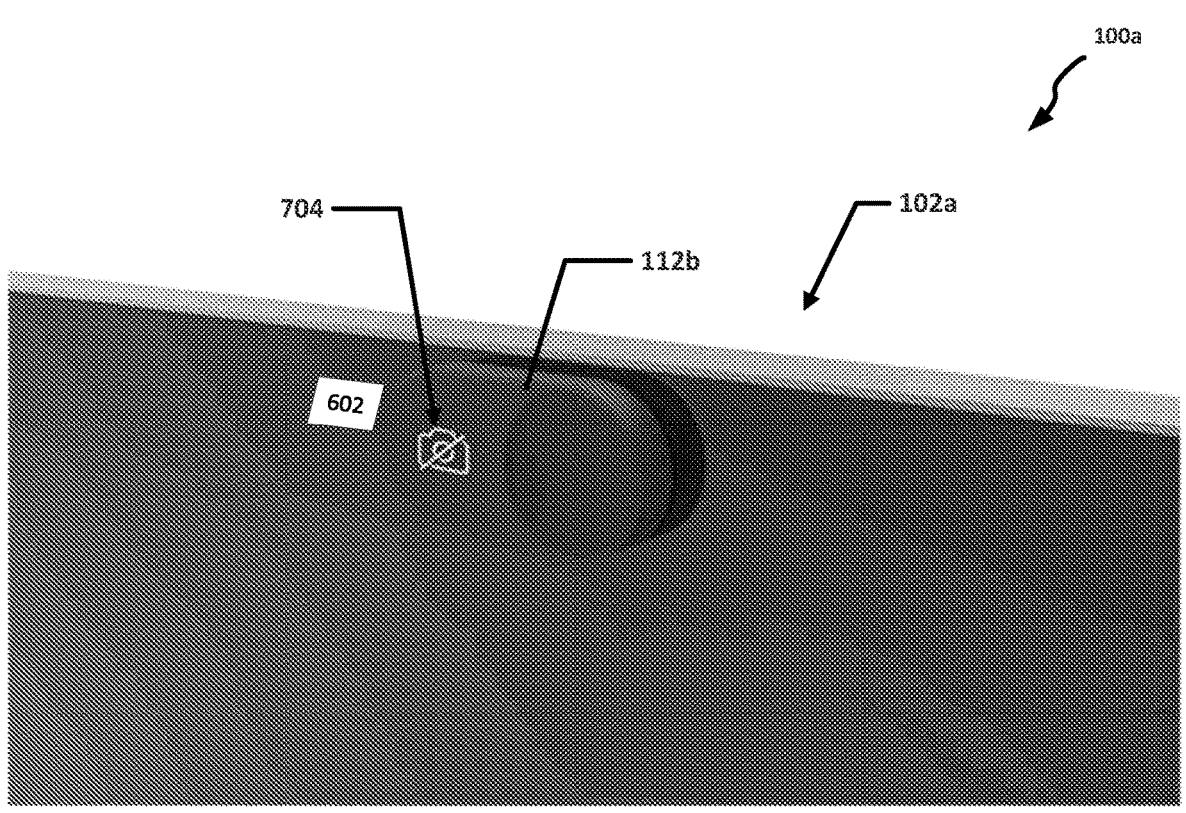
FIG. 8 is a simplified block diagram illustrating example details of a portion of a system to enable a self-orienting privacy cover, in accordance with an embodiment of the present disclosure.

As illustrated in FIG. 8, the indicator 704 can provide a visual indication to a user when the camera (not shown) is covered by the privacy cover 112b. In an example, the light pipe control module 702 can determine if the camera in the display 102a is covered by the privacy cover 112b. If the camera is covered by the privacy cover 112b, the light pipe control module 702 can activate the light pipe and cause the indicator 704 to illuminate to provide the user with a visual indicator that the camera is covered by the privacy cover 112b.

Figure 9A:
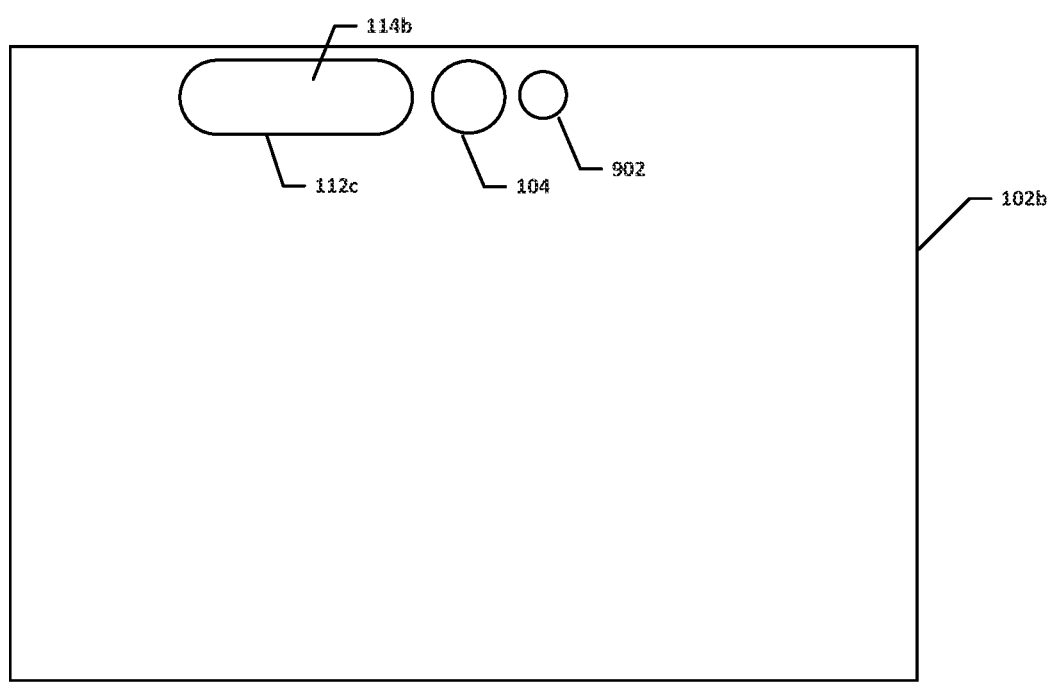
FIGS. 9A and 9B are simplified block diagrams illustrating example details of a portion of a system to enable a self-orienting privacy cover, in accordance with an embodiment of the present disclosure.
Figure 9B:
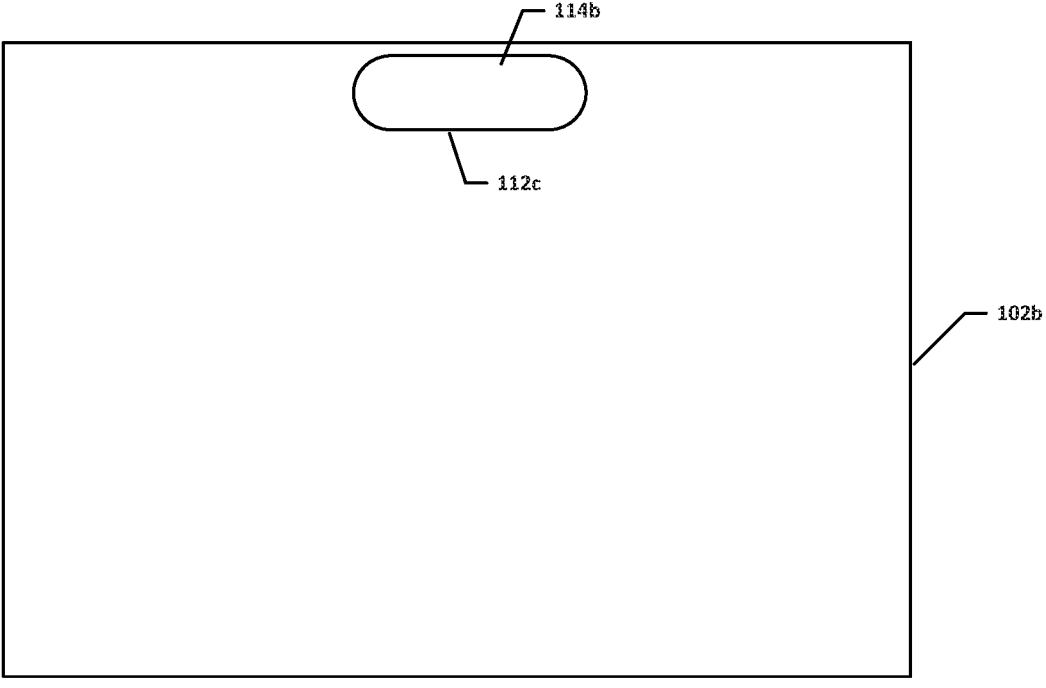

Turning to FIGS. 9A and 9B, FIGS. 9A and 9B are a simple block diagram illustrating example details of a portion of a privacy cover 112c, in accordance with an embodiment of the present disclosure. As illustrated in FIG. 9A, a display 102b can include the camera 104 and an infrared (IR) sensor 902. As illustrated in FIG. 9B, the privacy cover 112c can have a body 114b and the length of the body 114b can be configured to cover both the camera 104 and the IR sensor 902.

Figure 10A:
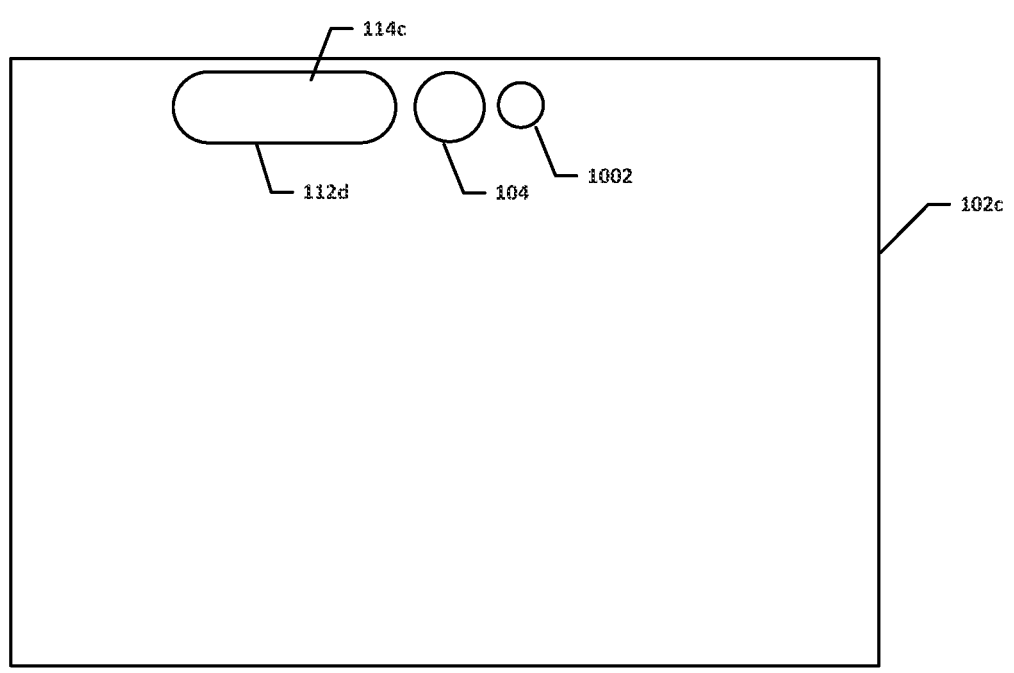
FIGS. 10A and 10B are simplified block diagrams illustrating example details of a portion of a system to enable a self-orienting privacy cover, in accordance with an embodiment of the present disclosure.
Figure 10B:
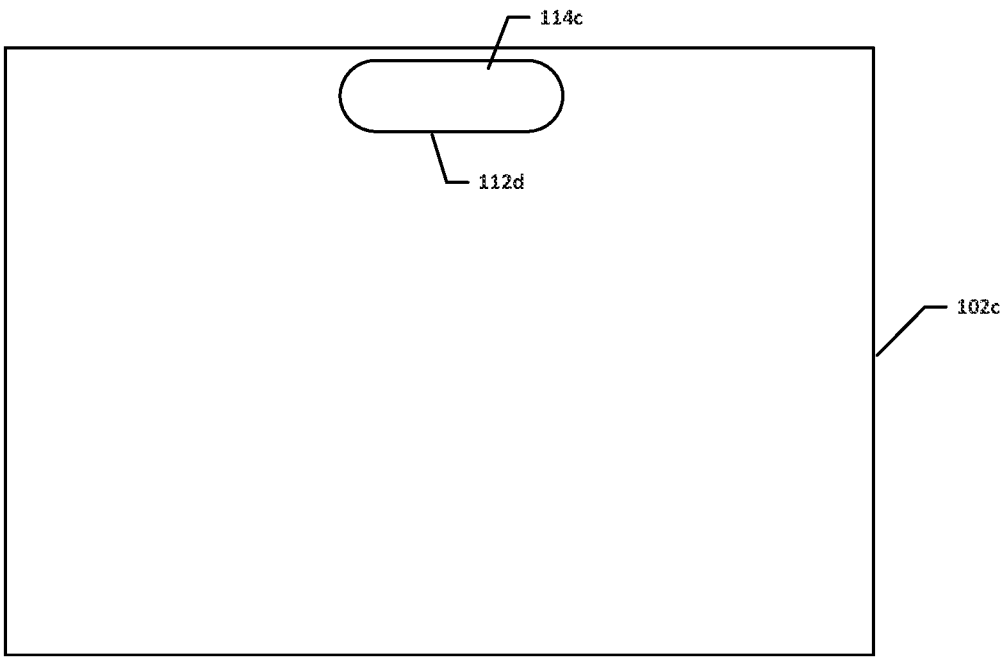

Turning to FIGS. 10A and 10B, FIGS. 10A and 10B are a simple block diagram illustrating example details of a portion of a privacy cover 112d, in accordance with an embodiment of the present disclosure. As illustrated in FIG. 10A, a display 102c can include the camera 104 and a microphone 1002. As illustrated in FIG. 10B, the privacy cover 112d can have a body 114c and the length of the body 114c is configured to cover both the camera 104 and the microphone 1002. In some examples, the body 114c of the privacy cover 122d can include foam or some other sound dampening material to dampen the sound going to the microphone 1002. In some examples, the main body 114 has a length that can cover two sensors in the display 102 or three sensors in the display 102.

Figure 11:
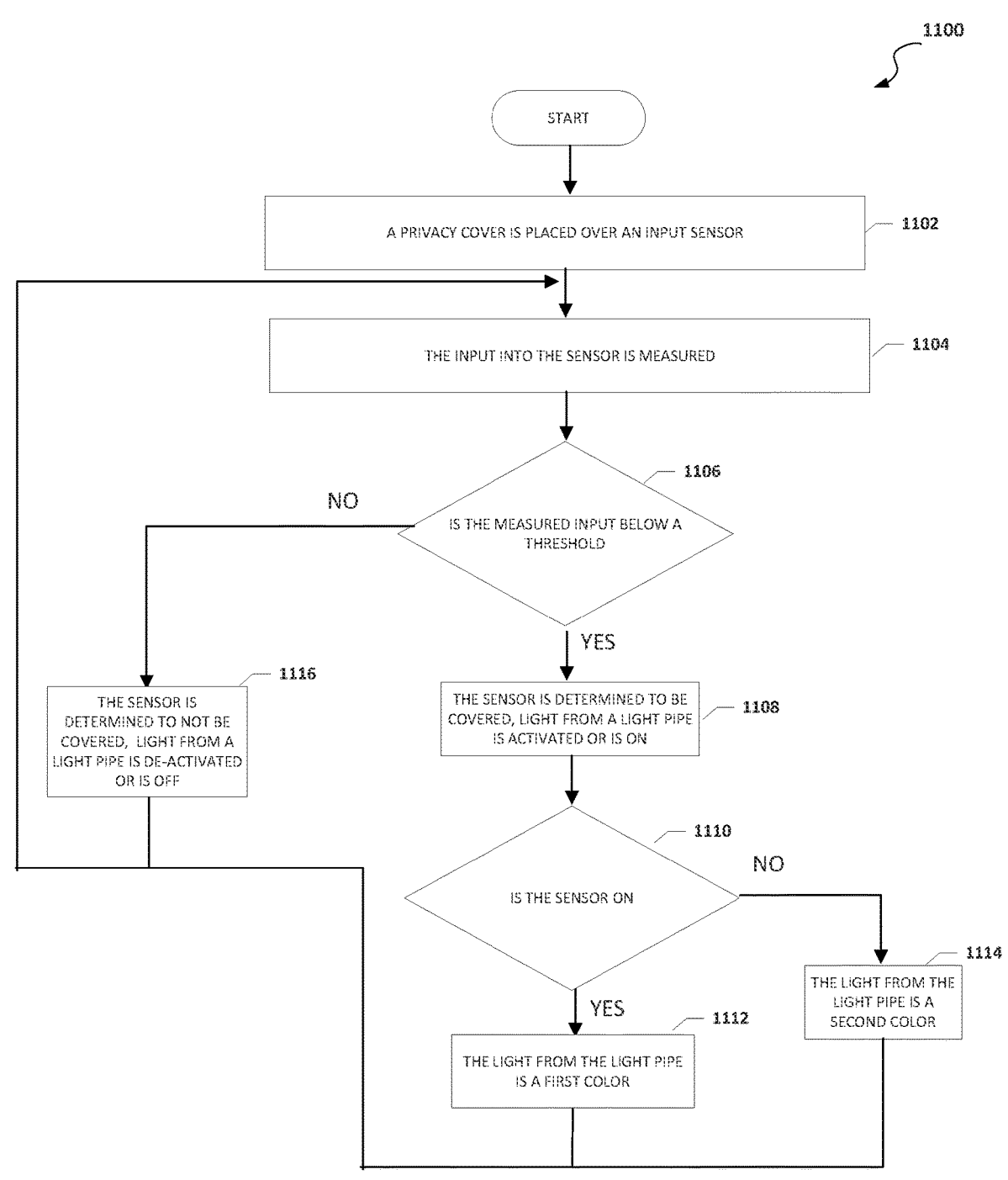
FIG. 11 is a simplified flowchart illustrating potential operations that may be associated with the system in accordance with an embodiment of the present disclosure.

Turning to FIG. 11, FIG. 11 is an example flowchart illustrating possible operations of a flow 1100 that may be associated with the self-orienting privacy cover, in accordance with an embodiment. In an embodiment, one or more operations of flow 1100 may be performed by the light pipe control module 702. At 1102, a privacy cover is placed over an input sensor. For example, the privacy cover 112 can be placed over the camera 104, the IR sensor 902, and/or the microphone 1002. At 1104, the input into the sensor is measured. For example, the light input into the camera 104 can be measured, the IR detected by the IR sensor 902 can be measured, the sound level or sound volume detected by the microphone 1002 can be measured, etc. At 1106, the system determines if the measured input is below a threshold. If the measured input is below the threshold, then the sensor is determined to be covered and light from a light pipe is activated or is on, as in 1108. For example, if the system determines that the amount of light detected by the camera is below a threshold (e.g., a threshold that indicates ninety percent darkness or more), then the light pipe 502 can be activated to illuminate the indicator 704 in the privacy cover 112*b* to provide a visual indication to the user that the sensor is covered. At 1110 the system determines if the sensor is on. If the sensor is on, then the light from the light pipe is a first color, as in 1112. For example, if a camera is on, then the light from the light pipe may be a red color. If the sensor is not on, then the light from the light pipe is a second color, as in 1114. For example, if a camera is not on, then the light from the light pipe may be a green or yellow color. Going back to 1106, if the measured input is not below the threshold, then the sensor is determined to not be covered and light from a light pipe is de-activated or is off, as in 1116. For example if the system determines that the amount of light detected by the camera is not below the threshold, then the light pipe 502 can be de-activated to not illuminate the indicator 704 in the privacy cover 112*b*. By the indicator 704 not being lit, the user can have a visual indication that the sensor is not covered.

Figure 12:
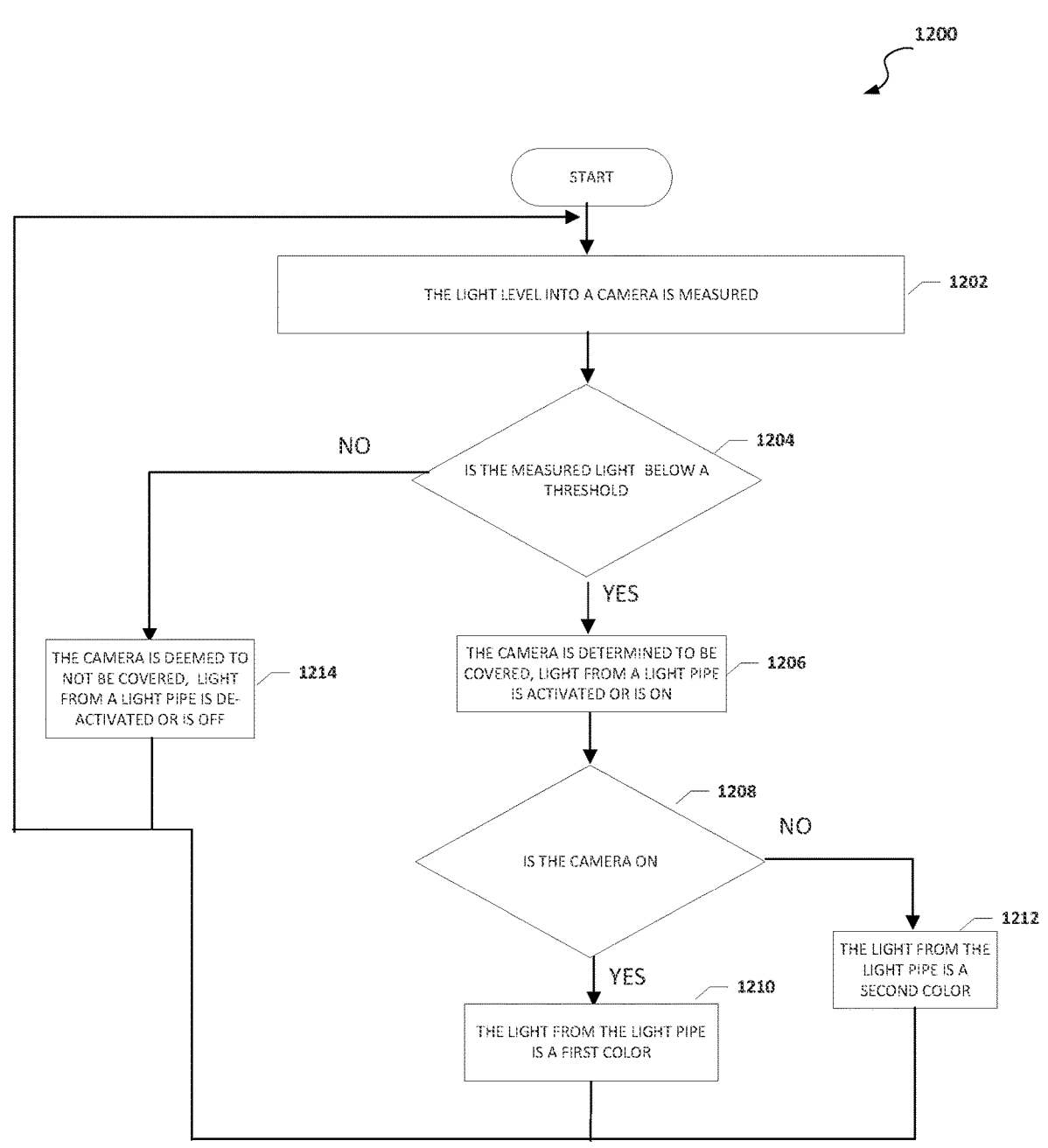
FIG. 12 is a simplified flowchart illustrating potential operations that may be associated with the system in accordance with an embodiment of the present disclosure.

Turning to FIG. 12, FIG. 12 is an example flowchart illustrating possible operations of a flow 1200 that may be associated with the self-orienting privacy cover, in accordance with an embodiment. In an embodiment, one or more operations of flow 1200 may be performed by the light pipe control module 702. At 1202, the light level into a camera is measured. At 1204, the system determines if the measured light is below a threshold. If the measured light is below a threshold, then the camera is determined to be covered and light from a light pipe is activated or is on, as in 1206. For example, if the system determines that the amount of light detected by the camera is below a threshold (e.g., a threshold that indicates ninety percent darkness or more), then the light pipe 502 can be activated to illuminate the indicator 704 in the privacy cover 112*b* and to provide a visual indication to the user that the camera is covered. At 1208 the system determines if the camera is on. If the camera is on, then the light from the light pipe is a first color, as in 1210. For example, if the camera is on, then the light from the light pipe may be a red color. If the camera is not on, then the light from the light pipe is a second color, as in 1212. For example if a camera is not on, then the light from the light pipe may be a green or yellow color. Going back to 1204, if the measured light is not below the threshold, then the camera is deemed to not be covered and light from the light pipe is de-activated or is off, as in 1214. For example if the system determines that the amount of light detected by the camera is not below the threshold, then the light pipe 502 can be de-activated to not illuminate the indicator 704 in the privacy cover 112*b*. By the indicator 704 not being lit, the user can have a visual indication that the sensor is not covered.

In an example, the electronic devices 100 and 100*a* can each include memory, one or more processors, the display 102, and a display engine or graphics processing unit (GPU). The display 102 can include a ICON. The display engine or GPU can communicate with the with the TCON.

The display engine or GPU can be a processor, a core of a processor, part of a core of a processor, a dedicated graphics processor, a core of a graphics processor, part of a core of a graphics processor, or a graphics engine. The display engine or GPU may be located on a system on chip (SoC) The display engine or GPU is responsible for transforming mathematical equations into individual pixels and frames and communicating the individual pixel and frames to the TCON. The ICON is a timing controller on the display side. The TCON receives the individual frames generated by the display engine or GPU, corrects for color and brightness, controls the refresh rate, controls power savings of display 102, touch (if enabled), etc. and is responsible for sending signals to the display backplane that will generate the image on the display 102. The display backplane can be the backplane that includes the materials and assembly designs used for the thin film transistors responsible for turning individual pixels on and off to enable an image to be shown on the display 102 for viewing by a user.

In an example implementation, the electronic devices 100 and 100*a* are meant to encompass a computer, a personal digital assistant (PDA), a laptop or electronic notebook, hand held device, a cellular telephone, a smartphone, an IP phone, wearables, IoT devices, network elements, network appliances, or any other device, component, element, or object that includes the display 102. The electronic devices 100 and 100*a* may include any suitable hardware, software, components, modules, or objects that facilitate the operations thereof, as well as suitable interfaces for receiving, transmitting, and/or otherwise communicating data or information in a network environment. This may be inclusive of appropriate algorithms and communication protocols that allow for the effective exchange of data or information. The electronic devices 100 and 100*a* may include virtual elements.

In regards to the internal structure, the electronic devices 100 and 100*a* can include memory elements for storing information to be used in operations. The electronic devices 100 and 100*a* may keep information in any suitable memory element (e.g., random access memory (RAM) read-only memory (ROM), erasable programmable ROM (EPROM), electrically erasable programmable ROM (EEPROM), application specific integrated circuit (ASIC), etc.), software, hardware, firmware, or in any other suitable component, device, element, or object where appropriate and based on particular needs. Any of the memory items discussed herein should be construed as being encompassed within the broad term 'memory element.' Moreover, the information being used, tracked, sent, or received could be provided in any database, register, queue, table, cache, control list, or other storage structure, all of which can be referenced at any suitable timeframe. Any such storage options may also be included within the broad term 'memory element' as used herein.

In certain example implementations, functions may be implemented by logic encoded in one or more tangible media (e.g., embedded logic provided in an ASIC, digital signal processor (DSP) instructions, software (potentially inclusive of object code and source code) to be executed by a processor, or other similar machine, etc.), which may be inclusive of non-transitory computer-readable media. In some of these instances, memory elements can store data used for operations. This includes the memory elements being able to store software, logic, code, or processor instructions that are executed to carry out operations or activities.

In an example implementation, elements of the electronic devices 100 and 100*a* may include software modules (e.g., the light pipe control module 702, etc.) to achieve, or to foster, operations as outlined herein. These modules may be suitably combined in any appropriate manner, which may be based on particular configuration and/or provisioning needs. In example embodiments, such operations may be carried out by hardware, implemented externally to these elements, or included in some other network device to achieve the intended functionality. Furthermore, the modules can be implemented as software, hardware firmware, or any suitable combination thereof. These elements may also include software (or reciprocating software) that can coordinate with other network elements in order to achieve the operations, as outlined herein.

Additionally, the electronic devices 100 and 100*a* can include one or more processors that can execute software or an algorithm. In one example, the processors could transform an element or an article (e.g., data) from one state or thing to another state or thing. In another example, activities may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read-only memory (EPROM), an electrically erasable programmable read-only memory (EEPROM)) or an ASIC that includes digital logic, software, code, electronic instructions, or any suitable combination thereof. Any of the potential processing elements, modules, and machines described herein should be construed as being encompassed within the broad term 'processor.'

Implementations of the embodiments disclosed herein may be formed or carried out on or over a substrate, such as a non-semiconductor substrate or a semiconductor substrate. In one implementation, the non-semiconductor substrate may be silicon dioxide, an inter-layer dielectric composed of silicon dioxide, silicon nitride, titanium oxide and other transition metal oxides. Although a few examples of materials from which the non-semiconducting substrate may be formed are described here, any material that may serve as a foundation upon which a non-semiconductor device may be built falls within the spirit and scope of the embodiments disclosed herein.

In another implementation, the semiconductor substrate may be a crystalline substrate formed using a bulk silicon or a silicon-on-insulator substructure. In other implementations, the semiconductor substrate may be formed using alternate materials, which may or may not be combined with silicon, that include but are not limited to germanium, indium antimonide, lead telluride, indium arsenide, indium phosphide, gallium arsenide, indium gallium arsenide, gallium antimonide, or other combinations of group III-V or group IV materials. In other examples, the substrate may be a flexible substrate including 2D materials such as graphene and molybdenum disulphide, organic materials such as pentacene, transparent oxides such as indium gallium zinc oxide poly/amorphous (low temperature of dep) III-V semiconductors and germanium/silicon, and other non-silicon flexible substrates. Although a few examples of materials from which the substrate may be formed are described here, any material that may serve as a foundation upon which a semiconductor device may be built falls within the spirit and scope of the embodiments disclosed herein.

It is also important to note that the operations in the preceding diagrams illustrates only some of the possible scenarios and patterns that may be executed by, or within, the electronic devices 100 and 100*a* and/or the display 102. Some of these operations may be deleted or removed where appropriate, or these operations may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by the electronic devices 100 and 100*a* and the display 102 in that any suitable arrangements, chronologies, configurations, and timing mechanisms may be provided without departing from the teachings of the present disclosure.

Note that with the examples provided herein, interaction may be described in terms of one, two, three, or more elements. However, this has been done for purposes of clarity and example only. In certain cases, it may be easier to describe one or more of the functionalities by only referencing a limited number of elements. It should be appreciated that the electronic devices 100 and 100*a* and the display 102, and their teachings, are readily scalable and can accommodate a large number of components, as well as more complicated/sophisticated arrangements and configurations. Accordingly, the examples provided should not limit the scope or inhibit the broad teachings of the electronic devices 100 and 100*a* and the display 102 as potentially applied to a myriad of other architectures.

Although the present disclosure has been described in detail with reference to particular arrangements and configurations, these example configurations and arrangements may be changed significantly without departing from the scope of the present disclosure. Moreover, certain components may be combined, separated, eliminated, or added based on particular needs and implementations. Additionally, although the electronic devices 100 and 100*a* and/or the display 102 have been illustrated with reference to particular elements and operations, these elements and operations may be replaced by any suitable architecture, protocols, and/or processes that achieve the intended functionality of the electronic devices 100 and 100*a* and/or the display 102.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

OTHER NOTES AND EXAMPLES

In Example A1, a privacy cover can include a main body to cover a sensor on an electronic device, and a privacy cover orientation magnet in the main body, where the privacy cover orientation magnet includes a plurality of positively biased areas and a plurality of negatively biased areas arranged in a specific orientation.

In Example A2, the subject matter of Example A1 can optionally include where the specific orientation is opposite a display specific orientation of a plurality of positively biased areas and a plurality of negatively biased areas in a display orientation magnet.

In Example A3, the subject matter of Example A1 can optionally include where the plurality of positively biased areas and the plurality of negatively biased areas in the privacy cover orientation magnet interact with the plurality of positively biased areas and the plurality of negatively biased areas in the display orientation magnet to self-orient the privacy cover over the sensor.

In Example A4, the subject matter of Example A1 can optionally include where the main body includes two privacy cover orientation magnets with a same orientation of the plurality of positively biased areas and the plurality of negatively biased areas.

In Example A5, the subject matter of Example A1 can optionally include where the main body has a length that can cover two sensors in a display.

In Example A6, the subject matter of Example A1 can optionally include where one of the two sensors is a camera integrated into the display.

In Example A7, the subject matter of Example A1 can optionally include where the privacy cover orientation magnet includes light pipe aperture.

In Example A8, the subject matter of Example A1 can optionally include an indicator, where the indicator is illuminated by light from a light pipe in a display when the privacy cover is magnetically coupled to the display over a camera.

In Example A9 the subject matter of any one of Examples A1-A2 can optionally include where the plurality of positively biased areas and the plurality of negatively biased areas in the privacy cover orientation magnet interact with the plurality of positively biased areas and the plurality of negatively biased areas in the display orientation magnet to self-orient the privacy cover over the sensor.

In Example A10, the subject matter of any one of Examples A1-A3 can optionally include where the main body includes two privacy cover orientation magnets with a same orientation of the plurality of positively biased areas and the plurality of negatively biased areas.

In Example A11, the subject matter of any one of Examples A1-A4 can optionally include where the main body has a length that can cover two sensors in a display.

In Example A12, the subject matter of any one of Examples A1-A5 can optionally include where one of the two sensors is a camera integrated into the display.

In Example A13, the subject matter of any one of Examples A1-A6 can optionally include where the privacy cover orientation magnet includes light pipe aperture.

In Example A14, the subject matter of any one of Examples A1-A7 can optionally include an indicator, where the indicator is illuminated by light from a light pipe in a display when the privacy cover is magnetically coupled to the display over a camera.

Example M1 is a method including placing a privacy cover over a sensor integrated into a display where the privacy cover includes a privacy cover orientation magnet, where the privacy cover orientation magnet includes a plurality of positively biased areas and a plurality of negatively biased areas arranged in a specific orientation to self-orient the privacy cover over the sensor.

In Example M2, the subject matter of Example M1 can optionally include where the display includes a display orientation magnet, where a plurality of positively biased areas and a plurality of negatively biased areas in the display orientation magnet are opposite in an orientation of the plurality of positively biased areas and the plurality of negatively biased areas in the privacy cover orientation magnet.

In Example M3, the subject matter of Example M1 can optionally include where the plurality of positively biased areas and the plurality of negatively biased areas in the privacy cover orientation magnet interact with the plurality of positively biased areas and the plurality of negatively biased areas in the display orientation magnet to self-orient the privacy cover over the sensor.

In Example M4, the subject matter of Example M1 can optionally include where the privacy cover includes a main body and the main body includes two privacy cover orientation magnets with a same configuration of the plurality of positively biased areas and the plurality of negatively biased areas.

In Example M5, the subject matter of Example M1 can optionally include where the privacy cover includes a main body and the main body has a length that can cover two sensors in a display when the privacy cover is attached to the display.

In Example, M6, the subject matter of Example M1 can optionally include where the privacy cover orientation magnet includes a light pipe aperture.

In Example, M7, the subject matter of Example M1 can optionally include where the privacy cover includes an indicator, the method further comprising illuminating the indicator when the privacy cover is magnetically coupled to the display over a camera.

In Example, M8, the subject matter of Example M1 can optionally include illuminating the indicator with a first color when the camera is on and illuminating the indicator with a second color when the camera is off.

In Example M9, the subject matter of any one of the Examples M1-M2 can optionally include where the plurality of positively biased areas and the plurality of negatively biased areas in the privacy cover orientation magnet interact with the plurality of positively biased areas and the plurality of negatively biased areas in the display orientation magnet to self-orient the privacy cover over the sensor.

In Example M10, the subject matter of any one of the Examples M1-M3 can optionally include where the privacy cover includes a main body and the main body includes two privacy cover orientation magnets with a same configuration of the plurality of positively biased areas and the plurality of negatively biased areas.

In Example M11, the subject matter of any one of the Examples M1-M4 can optionally include where the privacy cover includes a main body and the main body has a length that can cover two sensors in a display when the privacy cover is attached to the display.

In Example, M12, the subject matter of any one of the Examples M1-M5 can optionally include where the privacy cover orientation magnet includes a light pipe aperture.

In Example, M13, the subject matter of any one of the Examples M1-M6 can optionally include where the privacy cover includes an indicator, the method further comprising illuminating the indicator when the privacy cover is magnetically coupled to the display over a camera.

In Example, M14, the subject matter of any one of the Examples M1-M7 can optionally include illuminating the indicator with a first color when the camera is on and illuminating the indicator with a second color when the camera is off.

Example AA1 is an electronic device including a camera and a display orientation magnet next to the camera, where the display orientation magnet includes a plurality of positively biased areas and a plurality of negatively biased areas arranged in a specific orientation.

In Example AA2, the subject matter of Example AA1 can optionally include a light pipe next to the camera.

In Example AA3, the subject matter of Example AA1 can optionally include where the display orientation magnet includes a light pipe aperture to allow light from the light pipe to pass through the display orientation magnet.

In Example AA4, the subject matter of Example AA1 can optionally include where when a privacy cover is placed over the camera, the plurality of positively biased areas and the plurality of negatively biased areas in the display orientation magnet interact with a plurality of positively biased areas and a plurality of negatively biased areas in a privacy cover orientation magnet in the privacy cover to self-orient the privacy cover over the camera.

In Example AA5, the subject matter of any one of Examples AA1-AA2 can optionally include where the display orientation magnet includes a light pipe aperture to allow light from the light pipe to pass through the display orientation magnet.

In Example AA6, the subject matter of any one of Examples AA1-AA3 can optionally include where, when a privacy cover is placed over the camera the plurality of positively biased areas and the plurality of negatively biased areas in the display orientation magnet interact with a plurality of positively biased areas and a plurality of negatively biased areas in a privacy cover orientation magnet in the privacy cover to self-orient the privacy cover over the camera.

What is claimed is:

1. A privacy cover comprising:
a main body to cover a sensor on an electronic device; and
a privacy cover orientation magnet in the main body, wherein the privacy cover orientation magnet includes a plurality of positively biased areas, a plurality of negatively biased areas arranged in a specific orientation, and a light pipe aperture.

2. The privacy cover of claim 1, wherein the specific orientation is opposite a display specific orientation of a plurality of positively biased areas and a plurality of negatively biased areas in a display orientation magnet.

3. The privacy cover of claim 2, wherein the plurality of positively biased areas and the plurality of negatively biased areas in the privacy cover orientation magnet interact with the plurality of positively biased areas and the plurality of negatively biased areas in the display orientation magnet to self-orient the privacy cover over the sensor.

4. The privacy cover of claim 1, wherein the main body includes two privacy cover orientation magnets with a same orientation of the plurality of positively biased areas and the plurality of negatively biased areas.

5. The privacy cover of claim 1, wherein the main body has a length that can cover two sensors in a display.

6. The privacy cover of claim 5, wherein one of the two sensors is a camera integrated into the display.

7. The privacy cover of claim 1, further comprising:
an indicator, wherein the indicator is illuminated by light from a light pipe in a display when the privacy cover is magnetically coupled to the display over the sensor.

8. A method, comprising:
placing a privacy cover over a sensor integrated into a display, wherein the privacy cover includes a privacy cover orientation magnet, wherein the privacy cover orientation magnet includes a plurality of positively biased areas, and a plurality of negatively biased areas arranged in a specific orientation to self-orient the privacy cover over the sensor, and a light pipe aperture.

9. The method of claim 8, wherein the display includes a display orientation magnet, wherein a plurality of positively biased areas and a plurality of negatively biased areas in the display orientation magnet are opposite in an orientation of the plurality of positively biased areas and the plurality of negatively biased areas in the privacy cover orientation magnet.

10. The method of claim 9, wherein the plurality of positively biased areas and the plurality of negatively biased areas in the privacy cover orientation magnet interact with the plurality of positively biased areas and the plurality of negatively biased areas in the display orientation magnet to self-orient the privacy cover over the sensor.

11. The method of claim 8, wherein the privacy cover includes a main body and the main body includes two privacy cover orientation magnets with a same configuration of the plurality of positively biased areas and the plurality of negatively biased areas.

12. The method of claim 8, wherein the privacy cover includes a main body and the main body has a length that can cover two sensors in a display when the privacy cover is attached to the display.

13. The method of claim 8, wherein the privacy cover includes an indicator, the method further comprising:
illuminating the indicator when the privacy cover is magnetically coupled to the display over a camera.

14. The method of claim 13, further comprising:
illuminating the indicator with a first color when the camera is on; and
illuminating the indicator with a second color when the camera is off.

15. An electronic device comprising:
a camera; and
a display orientation magnet next to the camera, wherein the display orientation magnet includes a plurality of positively biased areas and a plurality of negatively biased areas arranged in a specific orientation; and
a light pipe next to the camera, wherein the display orientation magnet includes a light pipe aperture to allow light from the light pipe to pass through the display orientation magnet.

16. The electronic device of claim 15, wherein when a privacy cover is placed over the camera the plurality of positively biased areas and the plurality of negatively biased areas in the display orientation magnet interact with a plurality of positively biased areas and a plurality of negatively biased areas in a privacy cover orientation magnet in the privacy cover to self-orient the privacy cover over the camera.

* * * * *